(12) United States Patent
Ping

(10) Patent No.: US 6,529,687 B1
(45) Date of Patent: Mar. 4, 2003

(54) APS CAMERA AND METHOD

(75) Inventor: Yeung Chi Ping, Sai Ying Pun (HK)

(73) Assignee: Concord Camera Corp., Hollywood, FL (US)

( * ) Notice: Subject to any disclaimer, the term of this patent is extended or adjusted under 35 U.S.C. 154(b) by 0 days.

(21) Appl. No.: 09/533,909

(22) Filed: Mar. 23, 2000

Related U.S. Application Data

(60) Provisional application No. 60/126,880, filed on Mar. 30, 1999.

(51) Int. Cl.[7] .............................................. G03B 17/02
(52) U.S. Cl. ........................ 396/6; 396/387; 396/513
(58) Field of Search ............................ 396/6, 387, 388, 396/512, 513; 81/57.5

(56) References Cited

U.S. PATENT DOCUMENTS

| | | | |
|---|---|---|---|
| 2,674,931 A | 4/1954 | Mihalyi ........................ 95/31 |
| 2,989,906 A | 6/1961 | Rentschler ................ 396/539 |
| 3,096,699 A | 7/1963 | Harvey et al. ........ 396/535 X |
| 3,282,181 A | 11/1966 | Lange ........................... 95/11 |
| 3,481,261 A | 12/1969 | Fischer et al. ............. 396/301 |
| 4,332,448 A | 6/1982 | Zawodny .................... 354/213 |
| 4,351,599 A | 9/1982 | Suzuki et al. .............. 396/539 |
| 4,455,074 A | 6/1984 | Wong et al. ................ 396/405 |
| 4,685,790 A | 8/1987 | Uematsu .................... 354/203 |
| 4,804,987 A | 2/1989 | Arai .............................. 396/6 |
| 4,855,774 A | 8/1989 | Ohmura et al. ................ 396/6 |
| 4,896,178 A | 1/1990 | Ohmura et al. .......... 354/145.1 |
| 4,954,857 A | 9/1990 | Mochida et al. ............... 396/6 |
| 4,972,649 A | 11/1990 | Mochida et al. ........ 396/535 X |
| 5,000,396 A | 3/1991 | Barrella ...................... 396/387 |
| 5,063,400 A | 11/1991 | Takei et al. .................... 396/6 |
| RE34,168 E | 1/1993 | Ohmura et al. .......... 354/145.1 |
| 5,394,214 A | 2/1995 | Petruchik .................... 396/535 |
| 5,452,036 A | 9/1995 | Kamata ...................... 396/512 |
| 5,453,808 A | 9/1995 | Zawodny et al. ........... 354/212 |
| 5,511,261 A * | 4/1996 | Collins ........................... 7/158 |
| 5,550,608 A * | 8/1996 | Smart et al. ................. 396/538 |
| 5,555,052 A | 9/1996 | Pearson ...................... 354/203 |
| 5,555,054 A | 9/1996 | Zander ....................... 354/212 |
| 5,555,063 A | 9/1996 | Balling ....................... 354/288 |
| 5,574,337 A | 11/1996 | Dunsmore ............. 315/241 P |
| 5,579,070 A | 11/1996 | Smart et al. ................. 396/538 |
| 5,581,321 A | 12/1996 | Boyd .......................... 396/535 |
| 5,600,395 A | 2/1997 | Balling et al. ................. 396/6 |
| 5,602,609 A * | 2/1997 | Balling ....................... 396/284 |
| 5,608,480 A | 3/1997 | Smart et al. .................... 396/6 |
| 5,629,750 A * | 5/1997 | Smart et al. ................. 396/538 |
| 5,689,733 A | 11/1997 | Zawodny et al. ............... 396/6 |
| 5,717,968 A | 2/1998 | Zawodny et al. ........... 396/315 |
| 5,727,247 A * | 3/1998 | Smart et al. ................. 396/538 |
| 5,729,784 A | 3/1998 | Zawodny et al. ........... 396/358 |
| 5,748,990 A | 5/1998 | Smart et al. .................... 396/6 |
| 5,771,401 A * | 6/1998 | Lamphron et al. ............. 396/6 |
| 5,832,311 A | 11/1998 | Zawodny et al. ............... 396/6 |

(List continued on next page.)

FOREIGN PATENT DOCUMENTS

| | | |
|---|---|---|
| AU | 145487 | 2/1952 |
| DE | 949324 | 9/1956 |
| EP | 0462545 A2 | 12/1991 |
| EP | 0708360 A1 | 4/1996 |
| GB | 2130387 | 5/1984 |
| JP | 48-46622 | 10/1971 |

*Primary Examiner*—David M. Gray
(74) *Attorney, Agent, or Firm*—Woodcock Washburn LLP

(57) ABSTRACT

An APS single use camera has a cover with an aperture that provides access to the film sensor and the light lock door driver via a tool adapted to be received into the aperture. The tool is used to open the light lock door and push the film sensor out of the film path so as to enable film from the APS film cassette to be scrolled into the film path. The structure permits pre-loading of film outside of a darkroom, and such a method is disclosed. The camera also employs a brake that prevents the film sensor from sensing for the presence or absence of film except during a brief sensing interval that occurs during a film advance operation.

18 Claims, 13 Drawing Sheets

U.S. PATENT DOCUMENTS

| | | | |
|---|---|---|---|
| 5,862,414 A | 1/1999 | Zawodny et al. | 396/6 |
| 5,873,002 A * | 2/1999 | Glanville, Sr. et al. | 396/6 |
| 5,895,126 A * | 4/1999 | Watkins et al. | 396/6 |
| 6,012,857 A * | 1/2000 | Sangregory et al. | 396/411 |
| 6,014,521 A * | 1/2000 | Dussinger | 396/6 |
| 6,038,402 A * | 3/2000 | Horning et al. | 396/6 |
| 6,081,666 A | 6/2000 | Zawodny et al. | 396/6 |
| 6,085,037 A | 7/2000 | Zawodny et al. | 396/6 |
| 6,226,457 B1 * | 5/2001 | Boyd et al. | 396/6 |

* cited by examiner

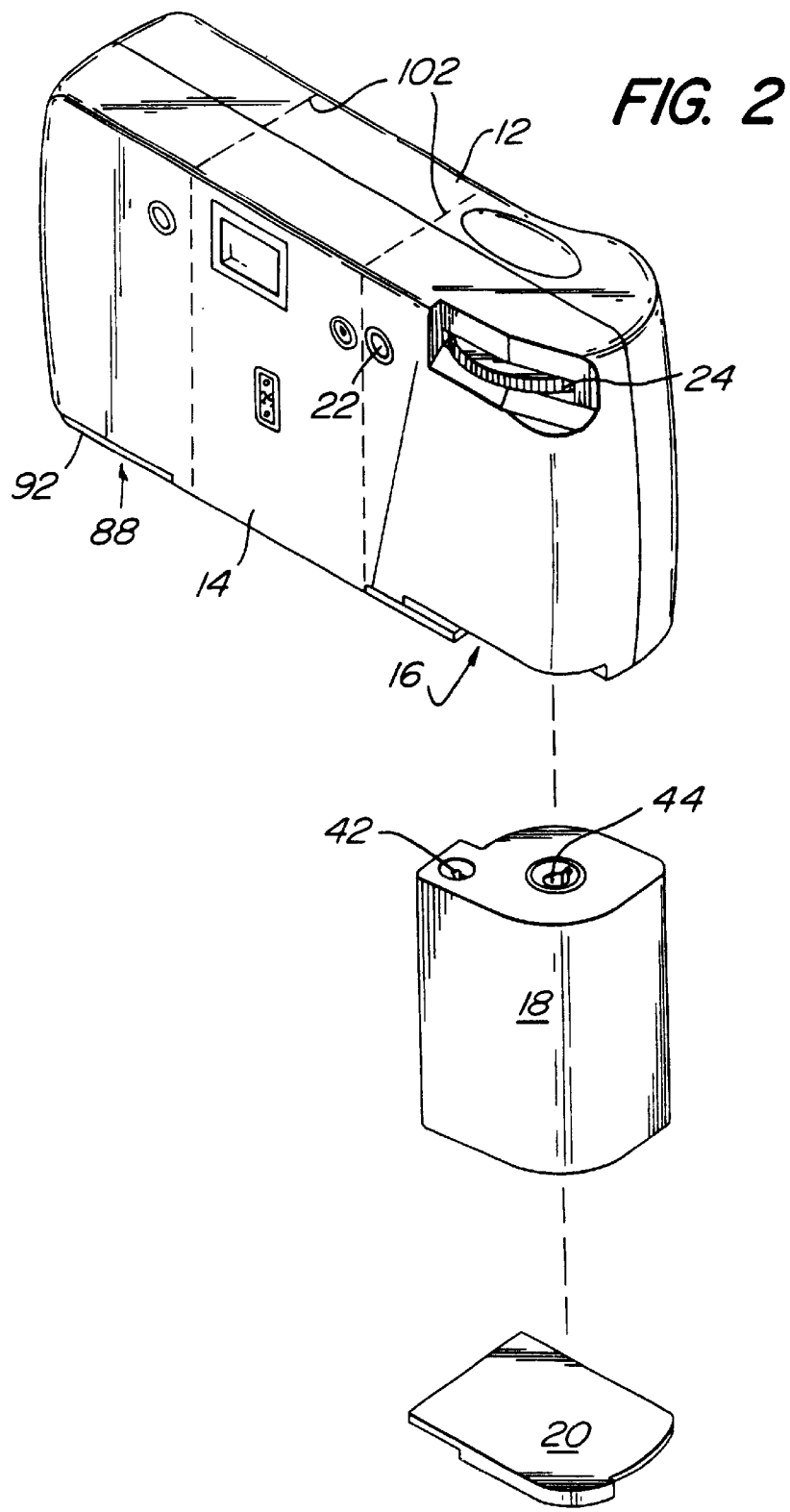

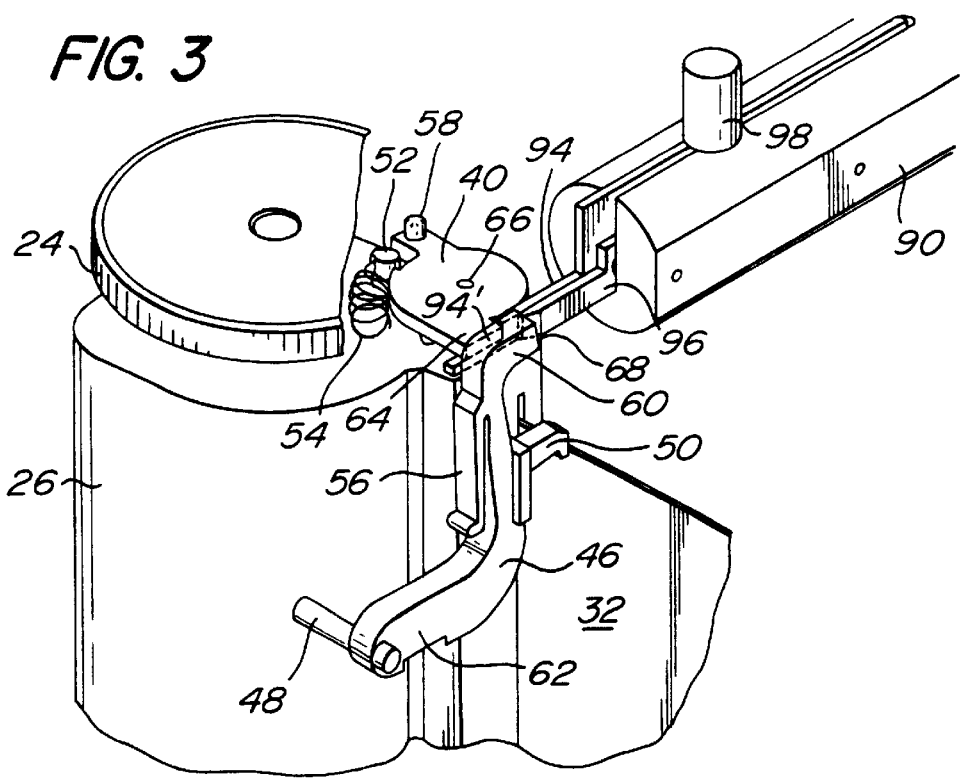
FIG. 3
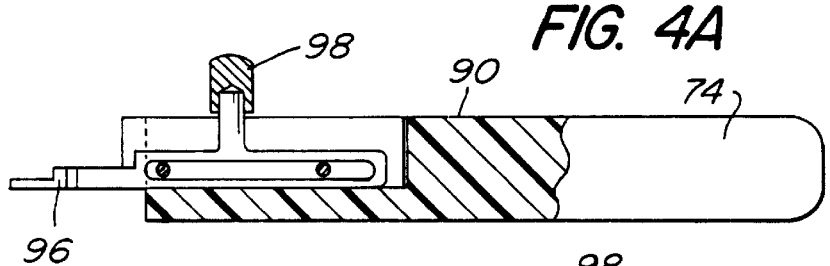
FIG. 4A
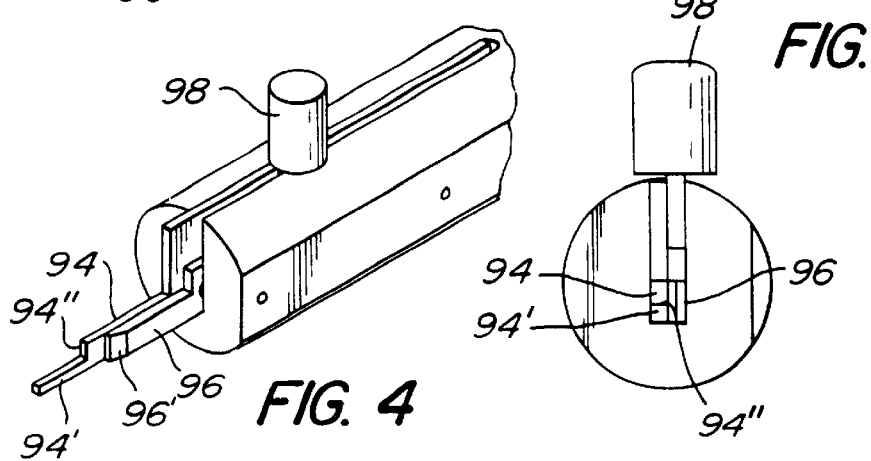
FIG. 4
FIG. 5

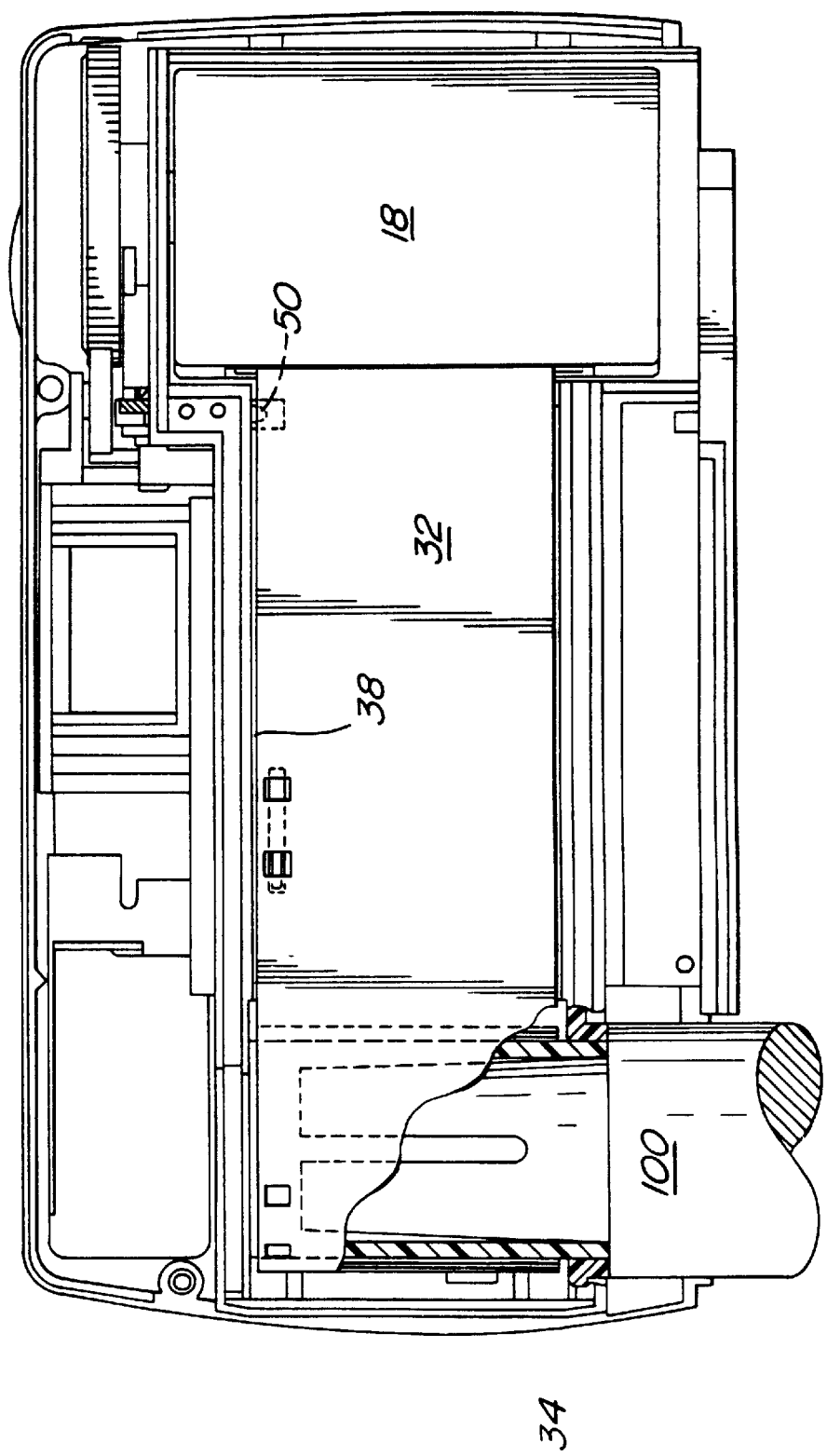

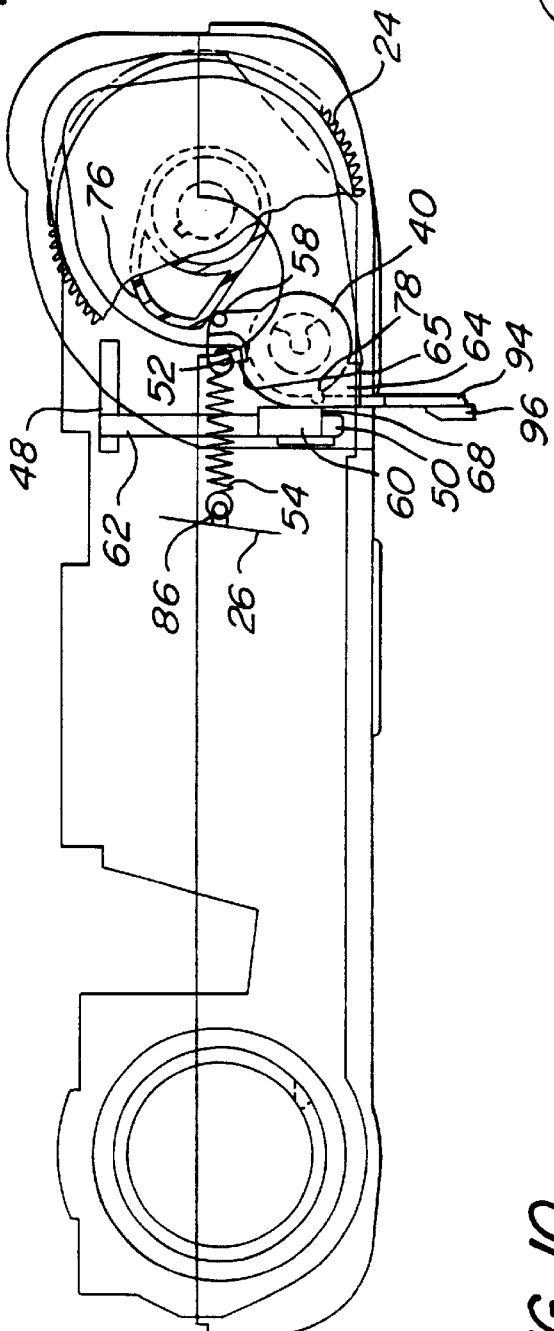
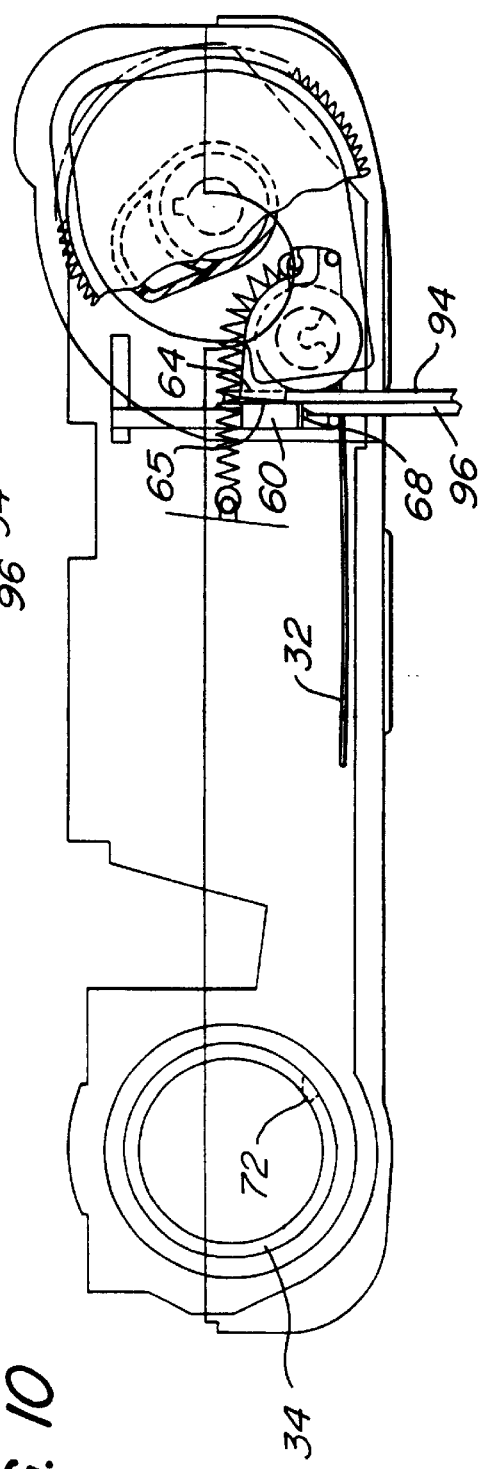

APS CAMERA AND METHOD

CROSS-REFERENCE TO RELATED APPLICATION

The present application is related to and claims the benefit of U.S. Provisional Patent Application Ser. No. 60/126,880, filed Mar. 30, 1999, entitled "APS Camera and Method."

BACKGROUND OF THE INVENTION

Conventional film cartridges, such as 35 mm film cartridges, have a film leader extending therefrom at the time of purchase, and a brush or similar mechanism at the cartridge's film slot to prevent light from entering the cartridge and exposing film contained therein. Another type of film cassette is variously referred to as an "APS film cassette" (wherein APS means Advanced Photo System), a "film safe cassette", or a "SSU film strip loaded cartridge." One example of such a film cassette is KODAK® brand ADVANTIX® film. The cameras with which these film cassettes are used are known as APS cameras. APS film cassettes do not, at the time of purchase, or at the time the film is first inserted into the camera, have a film leader extending from the cassette to facilitate film loading. Instead, APS film cassettes have a light lock door that must be opened in order to advance or scroll the film from the cassette. Once the light lock door of the film cassette has been opened, ambient light is free to enter the cassette and expose the film within the cassette. Therefore, the light lock door of an APS film cassette must be opened either inside of a light sealed camera or in darkroom conditions to prevent the film therein from being inadvertently exposed.

In conventional cameras, such as conventional 35 mm cameras, film is usually loaded from the back of the camera by opening a back door thereof, placing the cartridge into the camera, pulling the film leader across the camera, engaging the leader on a take-up spool and then closing the back door. Since opening the light lock door of an APS film cassette in the presence of light can expose the film within the cassette, conventional methods of loading film are not suited to APS cameras.

A typical APS film loading sequence involves loading film into the camera through a film cassette door disposed on the bottom of the camera and then closing the film cassette door to light-tightedly seal the camera. Following this, the light lock door of the film cassette is opened. The film is then driven out of the cassette, across a film path, and into a film spooling area on the opposite side of the camera from the cassette. Before the cassette can be removed from the camera, the film must be rewound back into the cassette, and the light lock door must be closed. Thus, APS cameras are designed to prevent opening of the film cassette door when the light lock door is open.

So called single use cameras are known in the art. A single use camera is one that has been preloaded with film at the factory and sold to the consumer with the intent of being used only a single time (i.e., with only the roll of preloaded film) by the end user. (Preloading generally connotes the process of loading the camera with a spool of unexposed film in a film spool compartment such that is opposite the film cartridge/cassette compartment such that, as exposures are taken, the exposed film is wound back into the film cartridge or cassette. Prewinding connotes the process of winding or spooling the unexposed film into the film spool compartment.) For 35 mm single use cameras, this is usually done by loading the film into the back camera in much the same way that a conventional 35 mm camera is loaded, then securely assembling a back cover to the camera by a locking mechanism, screws, adhesives, thermal bonding, etc. The film can be prewound into the film spool compartment of the camera either before the back cover is affixed to the camera (by spooling the film externally of the camera then placing the spool film in the film spool compartment) or after the back cover has been affixed to the camera (by applying a winding tool to the film spool). Typically, a package (such as paper, cardboard, plastic and/or adhesive labels) is placed on or around the camera body. (Hereinafter, the term "package" as used in connection with this application is intended to refer to both cardboard, paper, plastic and other types of packaging that may at least partly surround the camera body, and adhesive labels that may be affixed to at least front and/or back covers of the camera.) Depending upon the nature of the package, the film may not be removed without destroying at least part of the package. Usually, the film cannot be removed without destroying or disassembling part of the camera body. Additionally, film cannot easily be reloaded into the camera by the end user, at least not without partial destruction or disassembly of the camera body and/or its packaging. As described in commonly assigned U.S. Pat. Nos. 5,689,733 and 5,832,311 (hereinafter "the 733 and 311 patents"), the entirety of each of which is incorporated herein by reference, single use 35 mm cameras are usually loaded with the back cover removed so that the film leader can be attached to a film spool and/or so that the film can be wound into the film spool compartment.

Single use APS cameras are also known in the art. It will be appreciated that loading an APS film cassette into a single use APS camera presents special problems. The light lock door cannot be opened in non-darkroom conditions without exposing the film in the cassette, and thus conventional techniques used to preload 35 mm single use cameras cannot be employed unless film loading and final camera assembly take place in darkroom conditions. Prior art methods of loading film into single use APS cameras include performing the following steps in darkroom conditions, with the back cover of the camera removed: opening the light lock door of the cassette by inserting a tool or fixture into the light lock door spindle of the film cassette to rotate the light lock door to the open position before the cassette is placed in the camera; inserting a tool or fixture into the film spool spindle of the film cassette to drive a leader portion of the film from the cassette by rotating the spool inside the cassette with the tool or fixture; placing the cassette in a film cassette compartment of the camera; winding unexposed film from the cassette into a spool in a film spool compartment of the camera; then, assembling the back cover to the camera. If the camera requires a battery, then depending on the construction of the camera, the battery may have to be loaded in darkroom conditions as well. Thus, loading film into a single use camera may be cumbersome, time consuming and labor intensive. An improved method of loading film and a battery into an APS single use camera in non-darkroom conditions is described in the 733 and 311 patents.

Single use APS cameras usually automatically close the light lock door on the film cassette after all of the film has been rewound back into the cassette. This is usually done by means of a film sensor or other mechanism. Therefore, one issue that must be addressed in designing an APS camera is that of closing the light lock door of the film cassette after all of the film has been rewound into the film cassette. (In reusable APS cameras, this issue also entails preventing opening of the film cassette door until the light lock door has been closed.) In order to determine when to close the light lock door, there must be provided some indication that the film has been rewound into the film cassette. Typically, an APS camera employs a film sensor for this purpose. The function of the film sensor is to sense the presence or absence of film in the film path disposed between the film cassette compartment and the film spool compartment. The film sensor typically extends into the film path and rests against the film when film is present in the film path, thus detecting the presence of film outside of the film cassette. When film is no longer present at the film path location where the sensor is disposed, the absence of film is detected and it is assumed that all film has been wound into the film cassette. This causes the light lock door to close either automatically or upon further rotation of the film advance wheel. See, for example, U.S. Pat. No. 5,600,395 and the 733 and 311 patents. Generally, the film sensor presses against the film when film is present in the film path and thus exerts a force on the film in a direction transverse to the direction of travel of the film. Moreover, this force exists at all times that the film is present, including when the film is in motion, and may cause the film to deflect transverse to its direction of travel. Observation has shown that the action of the film sensor pressing against the film while the film is wound into the film cassette (i.e., after an exposure has been taken) may cause damage to or deterioration of the film because the film might rub against an internal surface of the camera or because the action of the film sensor rubbing against the film may cause damage to or deterioration of the film.

It is therefore desirable to provide a single use APS camera that is simple to preload with film and which can be easily preloaded in non-darkroom conditions. It is also desirable to provide an APS camera wherein the film sensor is prevented from applying potentially damaging forces to the film. The present invention addresses these goals.

SUMMARY OF THE INVENTION

An APS camera has an aperture in its body that opens to the exterior of the camera and light tightedly provides access to a light lock door driver and a film sensor mounted within the camera. A preloading tool is used to manipulate, via the aperture, the light lock door driver so as to open the light lock door and to move the film sensor out of the film path. The preloading tool includes, at one end, a movable member for operating the light lock door driver and a fixed member for operating the film sensor. The other end is for manipulation by a user. The camera's film advance mechanism is used to thrust film from the film cassette, into the film path, and into a film spool compartment after the light lock door has been opened and while the film sensor is held out of the film path. A winding tool is used to spool the film in the film spool compartment so as to pre-wind the film therein.

The light lock door driver is spring biased to urge the light lock door to a closed position, but is prevented from doing so due to interference from the film sensor when the film sensor is in a first position indicating that film is present in the film path. In addition, a brake is normally applied to the film sensor to prevent it from pressing against the film (and thus preventing it from sensing the presence or absence of film in the film path), except during a brief sensing interval that occurs during a short period of rotation of the film advance wheel. During the sensing interval, the brake is released and the film sensor is permitted to momentarily sense the presence or absence of film in the film path. If film is sensed, the brake is reapplied at the end of the sensing interval. If the absence of film is sensed, the film sensor moves to a second position (into the film path) wherein it no longer interferes with the light lock door driver, whereupon, due to the spring biasing, the light lock door driver rotates the light lock door to the closed position.

Other features of the invention are described below.

BRIEF DESCRIPTION OF THE DRAWINGS

FIG. 2 is a rear perspective view of the camera of FIG. 2.

FIG. 3 is a diagrammatical view of an interior portion of one embodiment of the camera of FIG. 1 and illustrates, in part, a light lock door driver and film sensor, and a preloading tool cooperating with the light lock door driver and film sensor to urge the same to a film preloading position.

FIG. 4 is a perspective view of the distal end of the preloading tool, showing one portion therof extended relative to another portion.

FIG. 4A is a side elevation of the preloading tool of FIG. 4, showing the distal end thereof in cross section.

FIG. 5 is a plan view of the distal end of the preloading tool of FIG. 4

FIG. 8 is a rear plan view of the camera of FIG. 1 with the back cover removed, and illustrates the film extending from the film cassette, fully across the film path and into the film spool compartment, and further illustrates a winding tool inserted into the film spool compartment to wind film therein.

FIG. 9 is a cross section taken through line 9—9 of FIG. 7 and illustrates an initial stage of a film preloading procedure wherein the preloading tool is first inserted into the aperture of the camera but has not yet manipulated the light lock door driver to the light lock door open position.

FIG. 10 is a cross section taken through line 9—9 of FIG. 7 and illustrates a further stage of a film preloading procedure wherein the preloading tool has manipulated the light lock door driver to the light lock door open position; in FIG. 10, the film from the film cassette is shown as partially extending into the film path, but not yet reaching the film spool compartment.

in FIG. 11, the film from the film cassette is shown wound in a spool in the film spool compartment.

DETAILED DESCRIPTION OF THE PREFERRED EMBODIMENT

Figure 1:
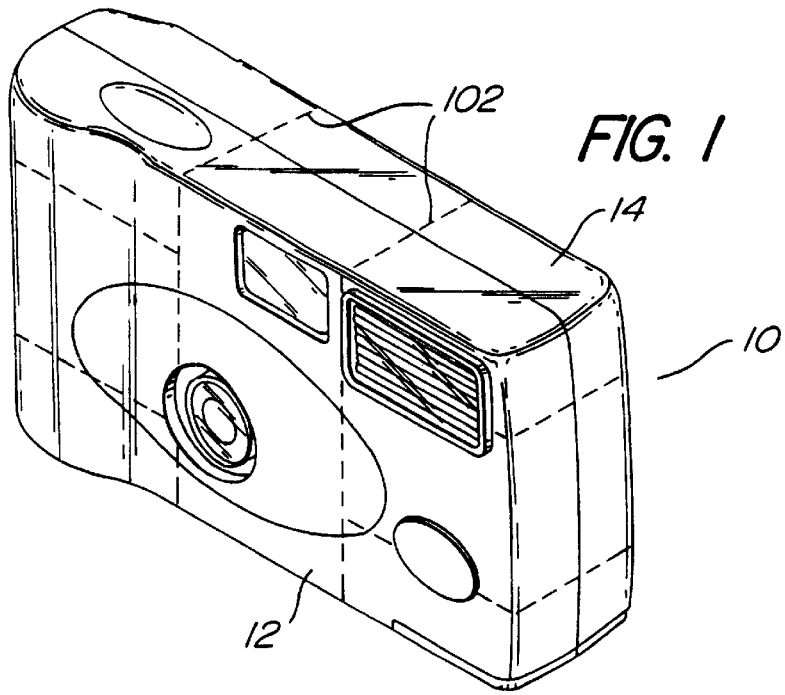
FIG. 1 is a front perspective view of one preferred embodiment of a single use APS camera according to the invention, showing one form of packaging that may be applied thereto in dotted lines.
Figure 7:
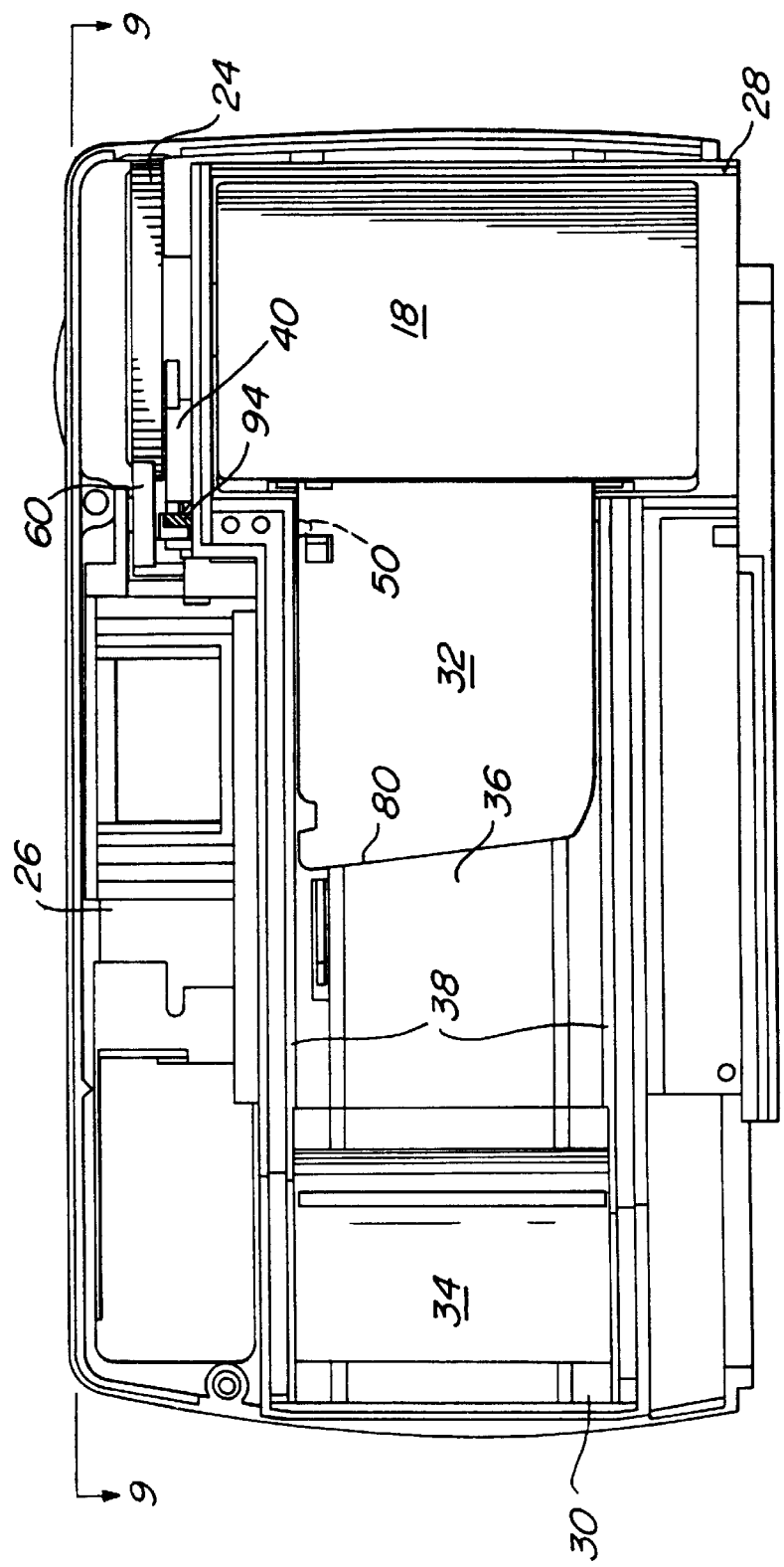
FIG. 7 is a rear plan view of the camera of FIG. 1 with the back cover thereof removed, and illustrates a stage of camera preloading wherein film extends from the film cassette part way into the film path.

Referring now to the drawings, wherein like numerals represent like elements, there is illustrated in FIGS. 1 and 2, one embodiment of a camera 10 that may incorporate the present invention. Preferably, camera 10 is a single use APS camera having a main body 26 (e.g., FIG. 7) sandwiched between a front cover 12 and a back cover 14 light tightedly sealed together. Camera 10 may have packaging (as herein defined) 102, as is common. Camera 10 may be provided with a first port 16 on the underside thereof for receiving an APS film cassette 18 therethrough for loading into a film cassette compartment, and a tab 20 for light tightedly sealing the film cassette compartment 28 after the cassette 18 has been received therein. Alternatively, cassette 18 may be loaded into camera 10 before the back cover 14 has been applied thereto, with the back cover 14 being applied so as to light tightedly seal the camera 10 after cassette 18 has been inserted into the camera. Either way, the method of the present invention involves preloading camera 10 with film from cassette 18 with the back cover 14 affixed to the camera 10 and such that camera 10 is substantially light tight. Camera 10 may also be provided with a second port 88 for receiving a winding tool 100 (FIG. 8) inside a film spool compartment 30 to facilitate prewinding. A second tab 92 may be provided for light tightedly sealing the film spool compartment after prewinding has been completed. Tabs 20 and 92 may be applied by mechanical means such as tongue and groove fastening, snap fit, etc., or may be adhesively bonded, thermally bonded, etc.

Camera 10 has a film path 36 disposed between the film cassette compartment 28 and the film spool compartment 30. See FIGS. 7 and 10. Film path 36 includes a pair of opposed, spaced apart rails 38 (FIGS. 7, 8), and thus film path 36 is defined longitudinally by the distance between the film cassette compartment 28 and the film spool compartment 30 and laterally by the distance between spaced apart rails 38. A tubular spool 34 having a film slot 72 for receiving a leading edge 80 of film 32 may be provided in film spool compartment 30. As more fully described in the 733 and 311 patents, slot 72 and film path 36 are designed such that no meaningful amount of light can enter the film path 36 to expose film 32 via slot 72. As also explained therein, once the leading edge 80 has been inserted into the slot 72 and the spool 34 has been rotated slightly, no light is permitted to enter the film path 36 or to expose any film wound on the film spool 34. Prior to application of tab 92, a winding tool 100 may be inserted into spool 34 to prewind film from the cassette 18. Additional details of the camera thus far described are available in the 733 and 311 patents, and reference is made thereto for such details. Thus, once cassette 18 has been sealed within the camera 10, the light lock door thereof may be opened without fear of exposing film in the cassette 18 or in any substantial portion of the film path 36, even though the second port 88 remains open, thus permitting use of a preloading and prewinding method that can be performed in non-darkroom conditions. The 733 and 311 patents teach one such method. According to the present invention, another such method is enabled.

Figure 6:
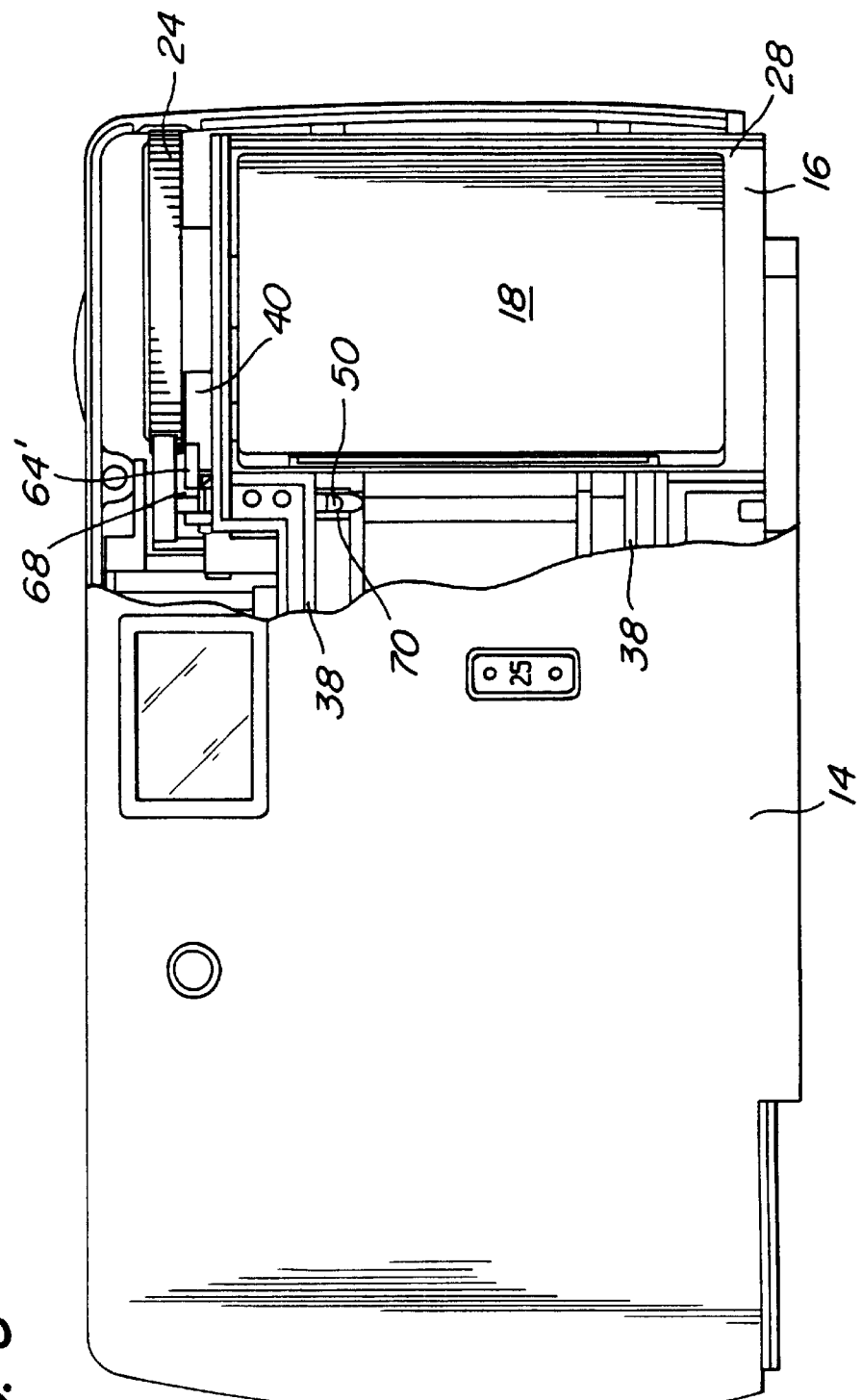
FIG. 6 is a rear plan view of the camera of FIG. 1, with a portion of that side of the camera containing the film cassette being shown in a partial cut-away view.
Figure 23:
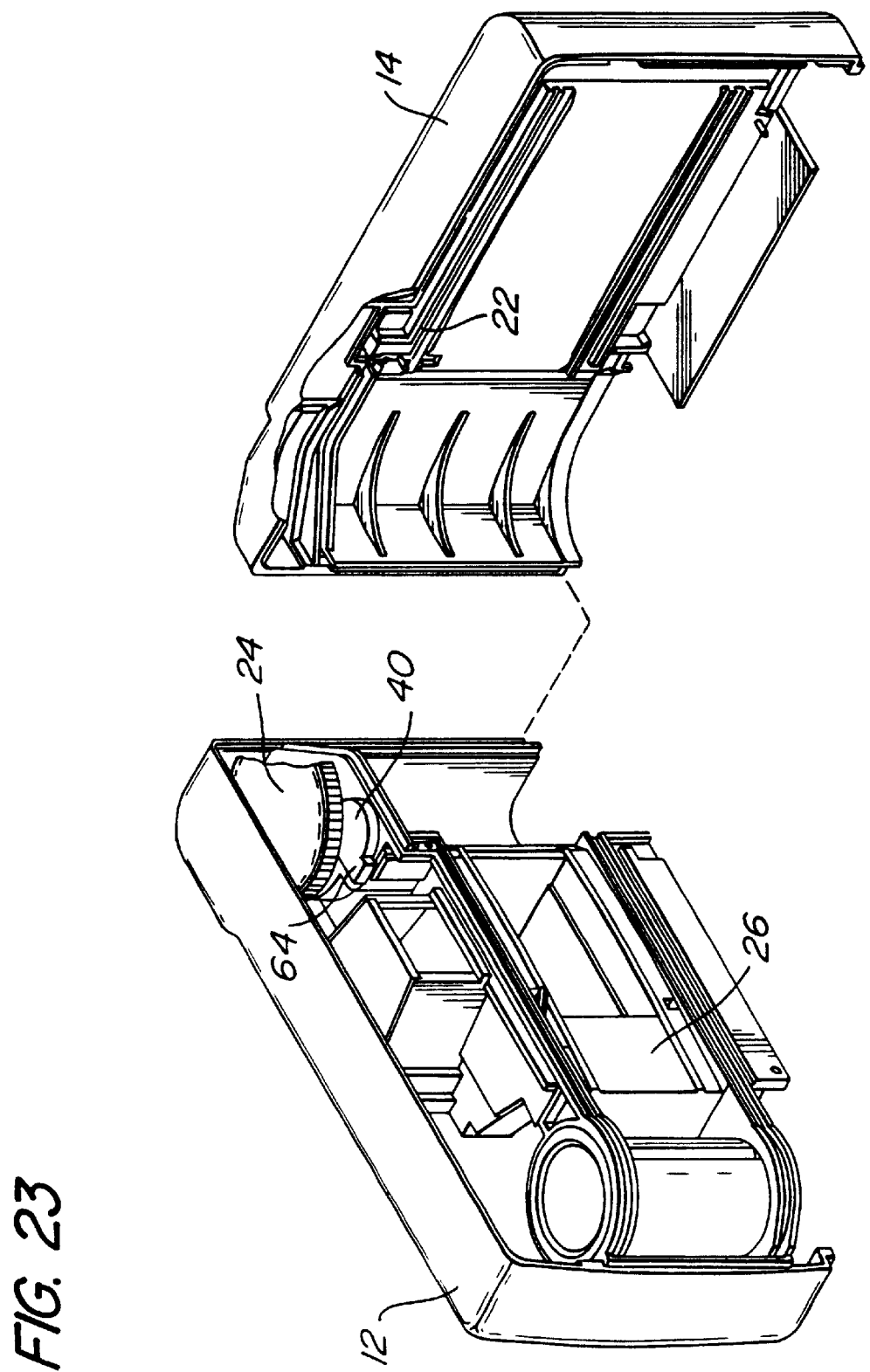
FIG. 23 illustrates the camera of FIG. 1 with its back cover removed and illustrates interior details of the back cover and main body of the camera.

Disposed in the back cover 14 is an aperture 22 in substantial alignment with a portion 64 of a light lock door driver 40 disposed in the camera and also in substantial alignment with a portion 68 of a film sensor 46 disposed on the main body 26 of camera 10. See FIGS. 2 and 23 for the aperture 22; see FIGS. 6 and 9–11 for the alignment of elements 64 and 68 with aperture 22. Aperture 22 is adapted to receive a pair of members 94, 96 disposed at a distal end of a preloading tool 90 as shown in FIGS. 3 and 9–11. Ambient light is prevented from entering the film cassette compartment 28 or film path 36 via aperture 22 by means of rails 38 and additional mating surfaces disposed on the main body 26 and inside of the back cover 14 so as to create a light tight seal and light tightedly envelop the film path 36. See, e.g., FIGS. 6, 7 and 23.

Figure 22:
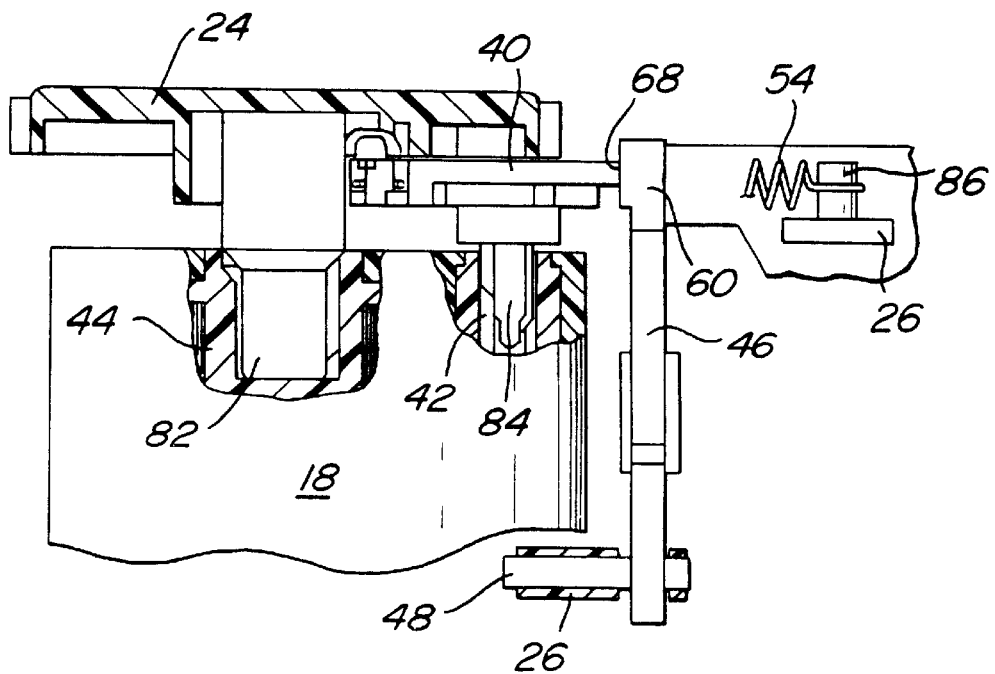
FIG. 22 is a cross section taken through line 22—22 of FIG. 18 and illustrates coupling of the light lock door driver and film advancing mechanism to the film cassette.

A manually rotatable advance wheel 24 has a shaft 82 adapted to cooperate with film spool spindle 44 of film cassette 18. Similarly, light lock door driver 40 has a shaft 84 adapted to cooperate with the light lock door spindle 42 of film cassette 18. See, e.g., FIGS. 2, 16 and 22. Thus, when the light lock door of cassette 18 is open, rotation of wheel 24 in a clockwise direction (as seen in FIG. 3) will scroll film 32 out of the cassette, while rotation thereof in a counter-clockwise direction will rewind film 32 back into the cassette. Light lock door driver is rotatably mounted to main body 26 by means of a pin 66 such that rotation of the light lock door driver 40 in a clockwise direction (as seen in FIG. 3) will open the light lock door, and rotation thereof in a counterclockwise direction (as seen in FIG. 3) will close the light lock door. (Note that pin 66 is located on the underside of driver 40, and cannot be seen from the top of driver 40. Element 66 shown in FIG. 3 is intended to show the placement of the pin beneath the driver 40.) A spring 54 coupled to a post 52 disposed on the light lock door driver 40 and to a post 86 on the main body 26 biases the light lock door driver in a direction (counterclockwise in FIG. 3) that tends to close the light lock door.

Figure 16:
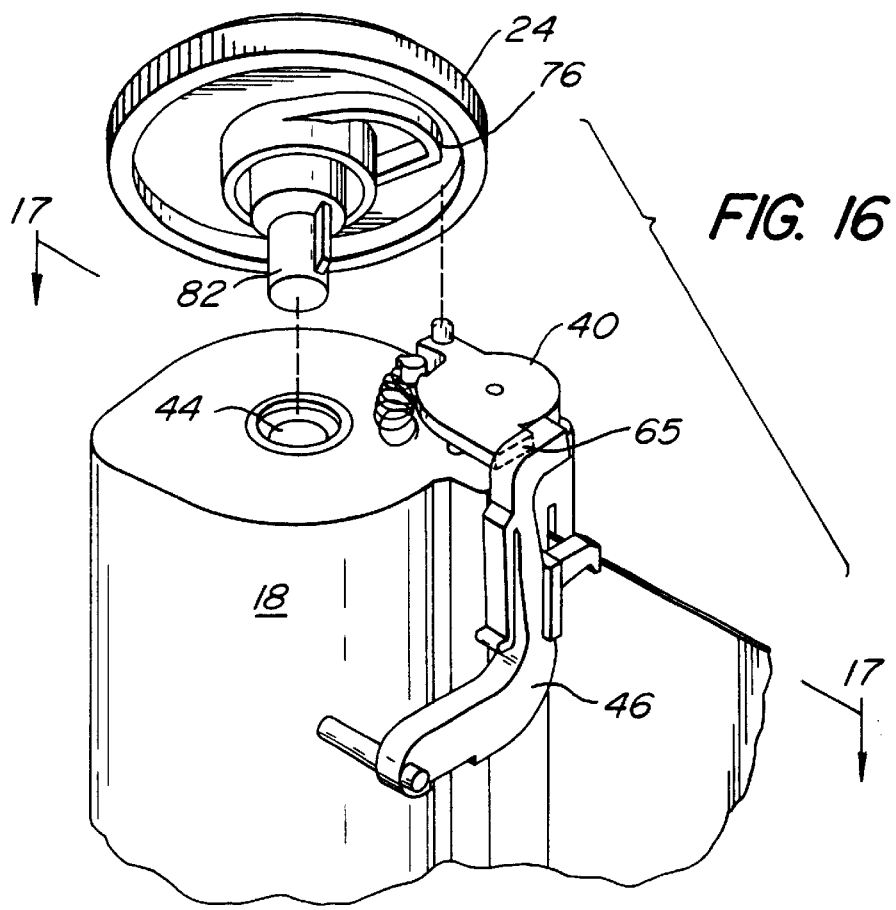
FIG. 16 illustrates the cooperation between the film advancing mechanism and the film cassette.
Figure 17:
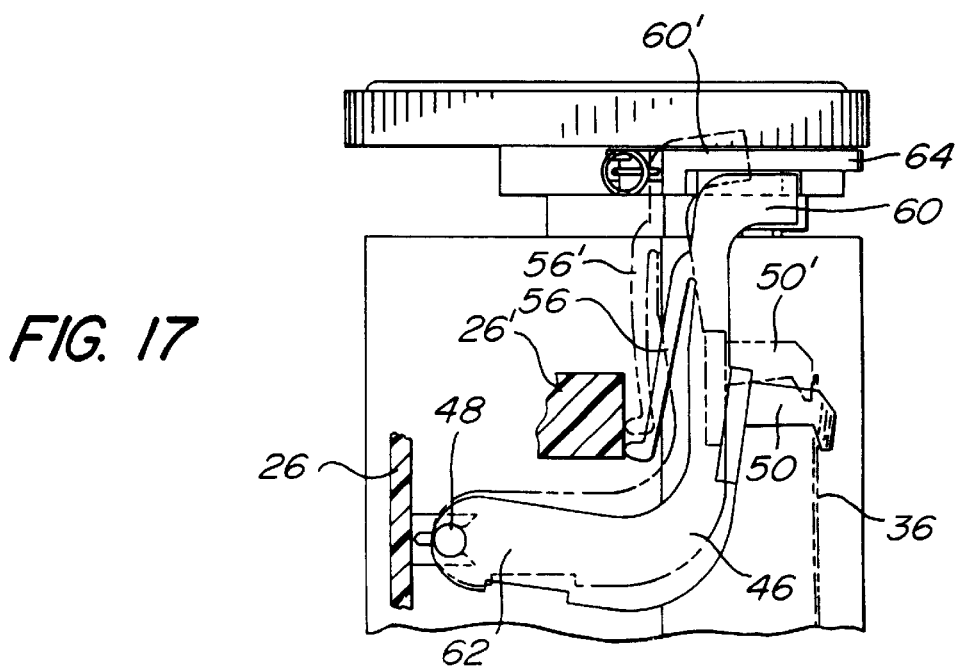
FIG. 17 is a side plan view of those details of the camera illustrated in FIG. 3, and further illustrates movement of the film sensor between the first (dotted line) and second (solid line) positions.

As best shown in FIGS. 3, 16 and 17, the lower end 62 of a film sensor 46 is mounted for partial rotation about a pin 48 coupled to the main body 26. The film sensor 46 includes an integral molded plastic spring section 56 compressed against the main body 26 so as to bias the upper portion 60 of the film sensor 46 in a clockwise direction as seen in FIG. 17. The film sensor 46 includes an integral film sensing finger 50 adapted to contact film 32 when present in the film path 36, and adapted to be received into a recess 70 (FIG. 6) when no film is present in the film path 36. Thus, when film 32 is present in the film path 36, the film sensor 36 is in the position indicated in dotted lines in FIG. 17, and when no film is present in the film path 36, the film sensor is in the position indicated by solid lines in FIG. 17. In FIG. 17, reference numerals 50', 56' and 60' indicate the position of those elements when film is present in the film path 36.

Figure 18:
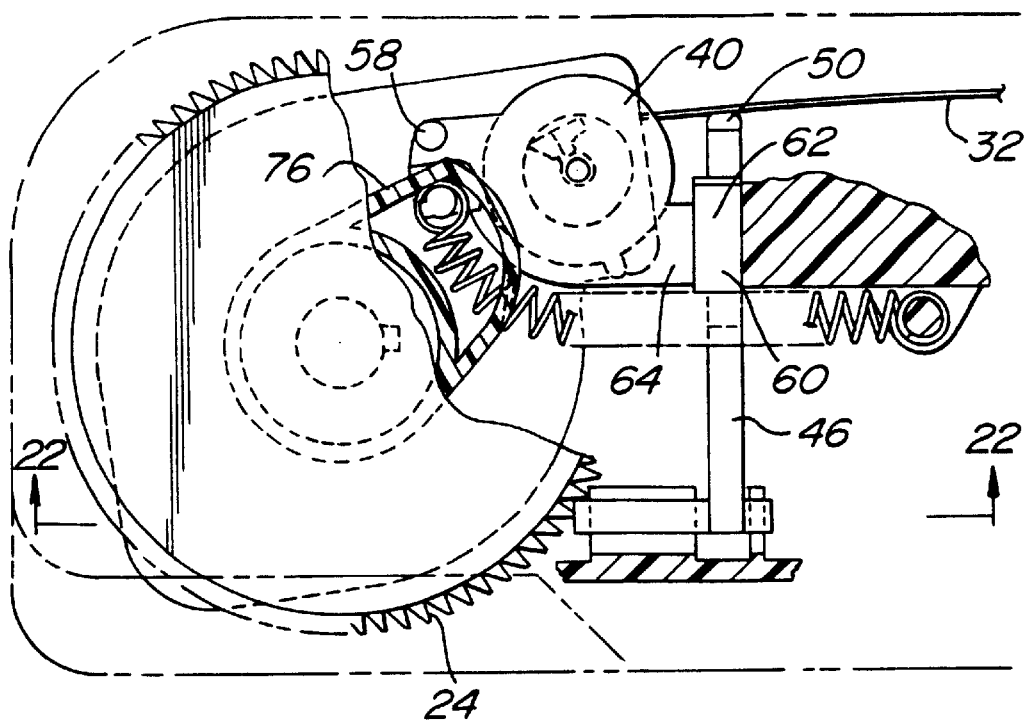

Light lock door driver 40 has a portion 64 that includes a flat surface 65. As best illustrated in FIGS. 3 and 18, when the light lock door driver has been rotated to a position corresponding to the light lock door open position (the position shown in FIGS. 3, 16 and 18), surface 65 is urged against a side of the upper portion 60 of film sensor 46 by action of the spring 54. Since the spring constant of spring 54 is greater than that of spring 56, the pressing of surface 65 against portion 60 of film sensor 46 prevents rotational movement of the film sensor. Thus, the force that would otherwise be applied by finger 50 to film 32 by action of spring 56 is overcome by the action of spring 54 causing surface 65 to press against upper portion 60. Finger 50 is therefore prevented from applying the force that would normally be exerted by spring 56 against film 32. Thus, surface 65 acts as a brake that prevents finger 50 from applying any meaningful pressure or force to film 32. As will be appreciated, the brake also prohibits finger 50 from sensing the absence of film, since rotation of film sensor 46 is inhibited during the time that the brake is applied.

Figure 20:
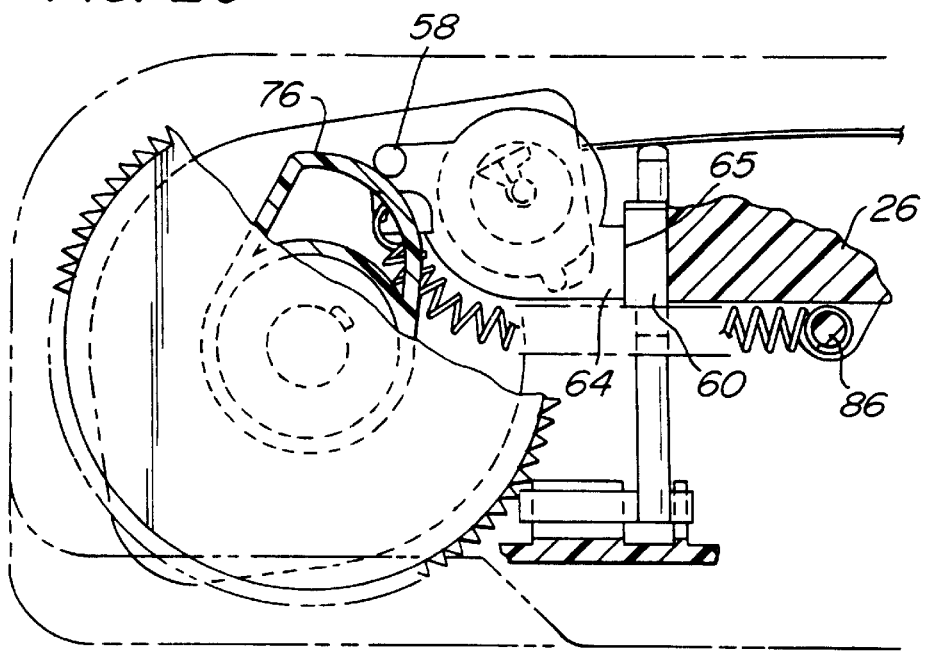
FIGS. 18, 19, 20, and 21 are a partial cross section, i.e., of the right hand side (film cassette compartment side), taken through line 9—9 of FIG. 7, with a portion of the advance wheel cut away to reveal additional details, and to show a sequence of events during a film rewinding procedure.
Figure 19:
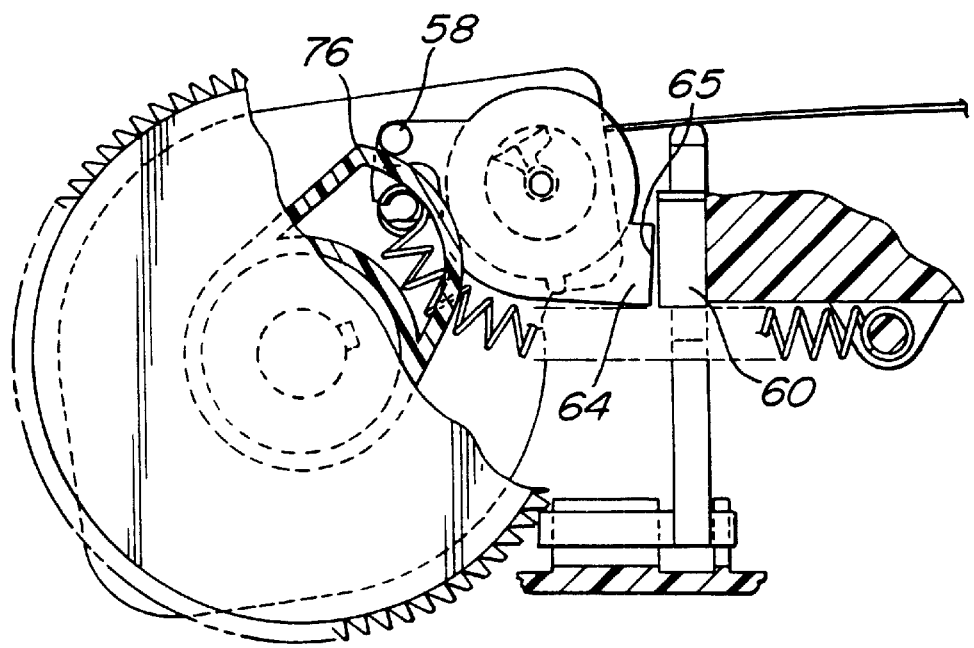
Figure 21:
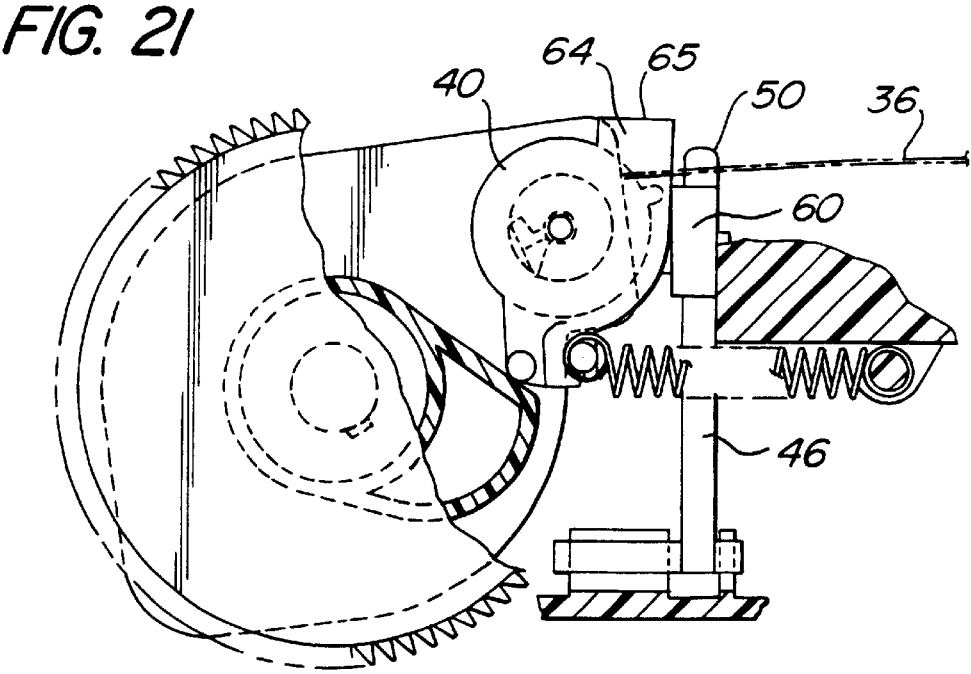

Integrally formed on the underside of wheel 24 is a cam 76, as shown in FIGS. 16 and 18–21. The cam is adapted to cooperate with a post 58 disposed on light lock door driver 40. FIG. 18 represents the position of the cam 76 relative to the post 58 before an exposure has been taken. It will be seen that the surface 65 of portion 64 is urged against the portion 60 of the film sensor 46 by action of spring 54, and hence the brake is applied. In FIG. 19, the film advance wheel has been slightly rotated in a counterclockwise direction so as to begin rewinding of the film into the cassette one frame after the taking of an exposure. It will be seen that the cam 76 has also rotated a slight amount so as to contact the post 58. This causes a slight rotation of light lock door driver 40 in a clockwise direction, such that surface 65 is removed from contact with portion 60. At this juncture, the brake has been removed, and finger 50 is free to sense the presence or absence of film 32 in the film path 36. This initiates a film sensing interval. In FIG. 20, the wheel 24 has been further rotated in a counterclockwise direction to continue the rewinding of one frame of film into the cassette. Cam 76 continues to advance relative to post 58 such that spring 54 returns light lock door driver 40 to a position where surface 65 again contacts upper portion 60 of the film sensor and again applies the brake. Thus, re-application of the brake has ended the sensing interval. Camera 10 may be designed so that only one 360° rotation of the manual advance 24 is required to wind one frame of film 32 into cassette 18, thus preventing multiple sensing intervals during the rewinding of a single frame. However, this is not necessary, and several sensing intervals may occur during the rewinding of a single frame. Importantly, however, finger 50 is prevented from applying the force that would normally be applied by reason of spring 56 during the entire time that film is being rewound into the cassette. It will thus be appreciated that, as long as film 32 is present in the film path, the film sensor 46 will remain in the position illustrated in dotted lines in FIG. 17, and the upper portion 60 will interfere with the rotation of the light lock door driver 40 in the counterclockwise direction, so as to prevent closing of the light lock door. However, if during the sensing interval illustrated in FIG. 19, no film were detected in film path 36, spring 56 would urge film sensor 46 to the position illustrated in solid lines in FIG. 17 such that the upper portion 60 would no longer interfere with the counterclockwise rotation of light lock door driver 40. Hence, light lock door driver 40 will be free to rotate counterclockwise by action of spring 54, until the light lock door has been fully closed, as shown in FIG. 21.

There has been described so far a structure for camera 10, including a brake, that prevents the film sensor from applying potentially damaging forces to film 32 during the entire time that film is being rewound into the cassette during a film rewind procedure. There has also been described a method of operation of such a brake sensing structure after film has been preloaded into the camera 10. There will now be described a tool for manipulating the light lock door driver 40 and film sensor 46 so as to permit film preloading in non-darkroom conditions, and a method for loading film into the camera using the tool in non-darkroom conditions.

Figure 11:
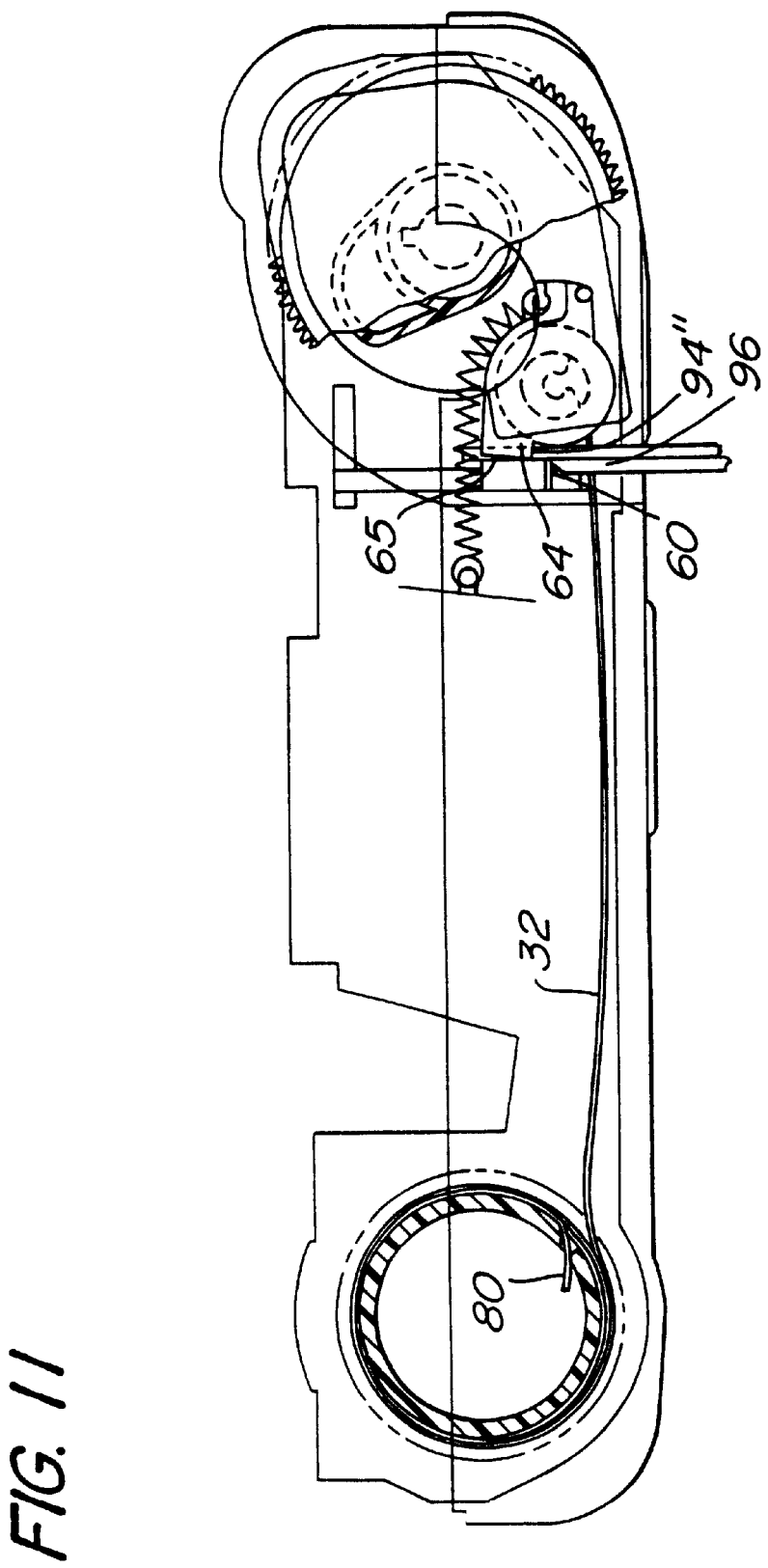
FIG. 11 is a cross section taken through line 9—9 of FIG. 7 and illustrates yet a further stage of a film preloading procedure wherein the light lock door is held in the light lock door open position with the preloading tool, and the tool has also been manipulated to move the film sensor out of the film path and so as to interfere with the light lock door driver.
Figure 12:
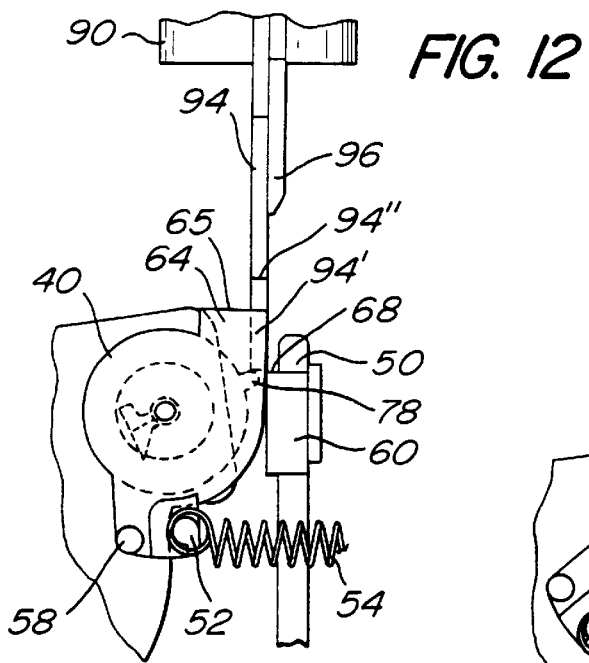
FIGS. 12, 13, 14 and 15 illustrate use of the preloading tool to manipulate the light lock door driver and film sensor, and particularly how the preloading tool is used to rotate the light lock door driver from a light lock door closed position (FIG. 12) to a light lock door open position (FIG. 14) and to move the film sensor from a first position (FIG. 12) to a second position that is out of the film path (FIG. 15).
Figure 13:
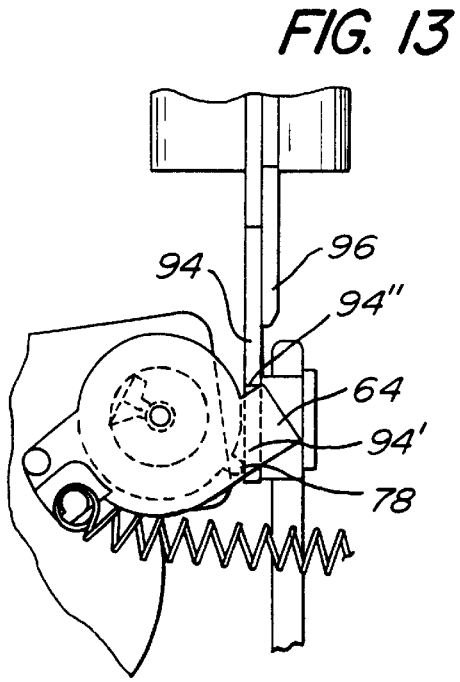
Figure 14:
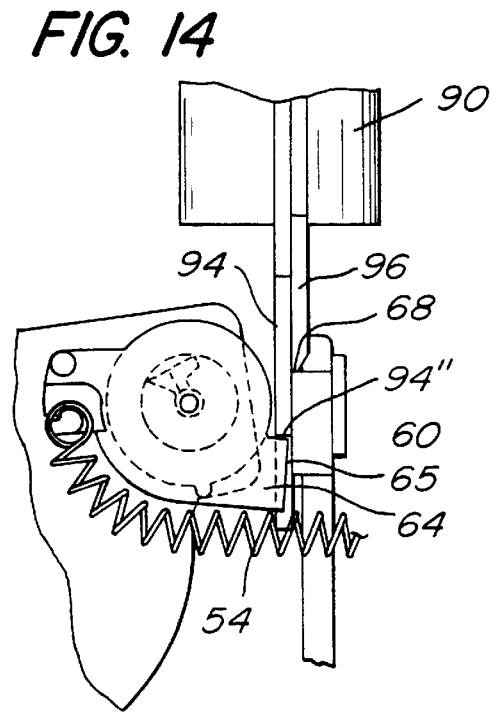
Figure 15:
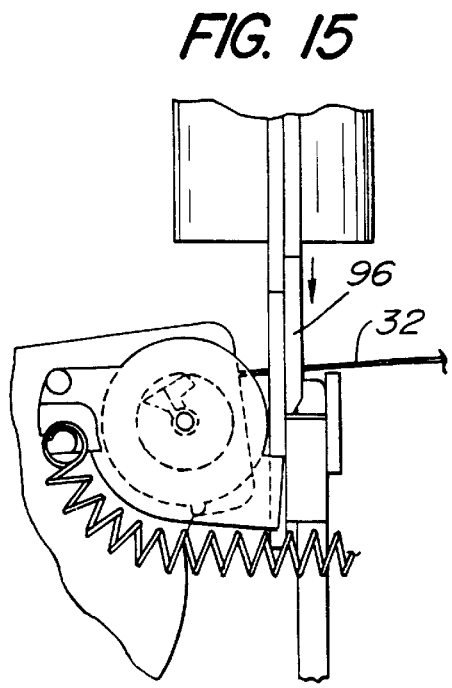

Preloading tool 90 has a handle portion 74 at a proximal end thereof and a pair of members 94, 96 at a distal end thereof. Member 94 is fixed relative to the handle 74. Member 96 is slideable between first and second positions by means of knob 98. As shown in FIG. 4, the end of slidable member 96 has a beveled edge 96', whereas fixed member 94 has a portion 94' that is stepped down at a distal end so as to create a shoulder 94". Member 94 is adapted to cooperate with portion 64 and a projecting member of 78 of light lock door driver 40, and member 96 is adapted to cooperate with surface 68 of portion 60 of film sensor 46. Particularly, as best illustrated in FIGS. 3 and 9–15, to preload camera 10 according to the method of the present invention, member 94 is inserted into aperture 22 so that the distal end 94' thereof contacts projecting member 78 disposed on the underside of light lock door driver 40. The tool 90 is then pushed toward the back cover 14 of the camera (into the camera) so as to rotate the light lock door driver 40 in a clockwise direction as seen in FIGS. 9–11, until the light lock door driver 40 has been rotated to the position indicated in FIG. 10. An internal stop may be provided to prevent further rotation of light lock driver 40 beyond the position shown in FIG. 10. It will be appreciated that the shoulder 94" will contact the portion 64 of light lock door driver 40 so as to allow continued rotation of the light lock door driver 40 after projecting member 78 has been rotated out of contact with the distal end 94' of member 94. In the position shown in FIG. 10, the light lock door of film cassette 18 has been opened. Next, the slidable member 96 is extended by means of knob 98 so that the distal end of member 96 contacts surface 68 of the upper portion 60 of film sensor 46. Continuing to extend the member 96 urges the finger 50 out of the film path 36 (e.g., to the position shown in dotted lines in FIG. 22). With the light lock door open and the finger 50 out of the film path 36, the manual advance wheel 24 is rotated in a clockwise direction (as seen in FIG. 10) to thrust film out of the cassette and into the film path 36. The film advance wheel is continued to be rotated until the film 32 is received into slot 72 (which has been previously oriented so as to receive the leading edge 80 of film 32). Thereafter, film winding tool 100 is inserted into the spool 34 and film is prewound into the film spool compartment to complete the preloading process. It will be appreciated that the preloading tool may be removed from aperture 22 after the film 32 has been received into the slot 72, since the brake will be applied to the film sensor as described above once the tool has been removed and the prewinding process may occur without fear of the finger 50 damaging the film.

There has been described a camera having a brake that prevents the application of potentially damaging forces to the film by the film sensor during both a preloading process (i.e., during prewinding) as well as during rewinding of the film into the cassette after each exposure has been taken. There has also been described a structure for implementing a sensing interval, occurring briefly during a film rewind procedure, during which time the film sensor is permitted to momentarily sense the presence or absence of film in the film path 36. There has been further been described a novel preloading procedure wherein camera 10 may be preloaded in non-darkroom conditions, including a tool for enabling such method. It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of the parts within the principles of the invention to the full extent indicated by the broad general meaning of the terms in which the appended claims are expressed.

What is claimed is:

1. A camera of the type that employs a film cassette having a light lock door comprising:
   a) a main body having a film cassette compartment and a film spool compartment disposed on opposing sides of a film exposing area and defining a film path therebetween;
   b) a light lock door driver rotatably mounted to the main body and adapted to cooperate with the light lock door, the light lock door driver being operative between a first driver position corresponding to a light lock door closed position and second driver position corresponding to a light lock door open position and being biased toward the first driver position;
   c) a film sensor mounted to the main body and disposed adjacent a portion of the film path and being operative between a first sensor position into the film path indicating that film is not present in the portion of the film path and a second sensor position out of the film path indicating that there is film present in the portion of the film path, the film sensor being biased toward the first sensor position;
   d) a cover affixed to the main body and light tightedly enveloping the film path, film cassette compartment and film spool compartment, there being an aperture in the cover light tightedly isolated from the film path, film cassette compartment and film spool compartment and in substantial alignment with a portion of each of the light lock door driver and film sensor, the light lock door driver being movable from the first driver position to the second driver position via a tool inserted into the aperture, the film sensor being movable from the first sensor position to the second sensor position via the tool.

2. The tool in combination with the camera of claim 1, the tool comprising:
   a handle portion at a proximal end thereof;
   a pair of members at a distal end thereof, each member being adapted to be received into the aperture, a first one of the members being adapted to cooperate with the portion of the light lock door driver and a second one of the members being adapted to cooperate with the portion of the film sensor, at least one of the members being movable relative to the other member;
   an actuator coupled to the movable member for moving the movable member relative to the other member.

3. A method comprising:
   a) providing a camera having:
      (i) a main body having a film cassette compartment and a film spool compartment on opposing sides of a film path, the film cassette compartment adapted to receive a film cassette of the type having a light lock door;
      (ii) an advance mechanism adapted to cooperate with the film cassette for scrolling unexposed film out of the film cassette when the advance mechanism is operated in a first mechanism direction and for winding exposed film into the film cassette as exposures are taken when the advance mechanism is operated in a second mechanism direction;
      (iii) a film sensor mounted to the main body and disposed adjacent a portion of the film path and being operative between a first sensor position into the film path indicating that film is not present in the portion of the film path and a second sensor position out of the film path indicating that there is film present in the portion of the film path, the film sensor being biased toward the first sensor position;
      (iv) a light lock door driver rotatably mounted to the main body and adapted to cooperate with the light lock door, the light lock door driver being operative between a first driver position corresponding to a light lock door closed position and second driver position corresponding to a light lock door open position and being biased toward the first driver position;
      (v) a cover affixed to the main body and light tightedly enveloping the film path, film cassette compartment and film spool compartment, there being an aperture in the cover light tightedly isolated from the film path, film cassette compartment and film spool compartment and in substantial alignment with a portion of each of the light lock door driver and film sensor;
   b) inserting the film cassette into the film cassette compartment by means of an opening in the underside of the camera and then closing the opening;
   c) inserting a tool into the aperture to manipulate the light lock door driver and the film sensor to the second driver position and second sensor position, respectively;
   d) operating the advance mechanism in the first direction to scroll film out of the film cassette, across the film path and into the film spool compartment in unexposed form;
   e) winding substantially all of the film from the film cassette onto the film spool in unexposed form such that substantially all of the film wound onto the spool is unexposed;
   wherein elements (b) through (e) are performed with the cover assembled to the camera.

4. The method according to claim 3 further comprising:
   providing the tool, the tool comprising a handle portion at a proximal end thereof, a pair of members at a distal end thereof, each member being adapted to be received into the aperture, a first one of the members being adapted to cooperate with the portion of the light lock door driver and a second one of the members being adapted to cooperate with the portion of the film sensor, at least one of the members being movable relative to the other member, and, an actuator coupled to the movable member for moving the movable member relative to the other member; and,
   element (c) comprises inserting the members into the aperture and manipulating the actuator and the tool so as position the light lock door driver and the film sensor to the second driver position and second sensor position, respectively.

5. The method according to claim 3 wherein elements (b) through (e) are performed outside of a darkroom.

6. A camera of the type that employs a film cassette having a light lock door comprising:
   a) a film sensor mounted to a body of the camera adjacent a portion of a film path of the camera and being operative between a first sensor position into the film path and a second sensor position out of the film path, the film sensor being biased toward the film path by a biasing force;

b) a light lock door driver rotatably mounted to the body and adapted to cooperate with the light lock door, the light lock door driver having a portion defining a braking surface adapted to normally apply a braking force to a portion of the film sensor when the film sensor is in the second sensor position so as to prevent the film sensor from applying the full amount of the biasing force to film present in the film path;

c) a film advance mechanism having a portion cooperating with the light lock door driver to cause the braking surface to be momentarily removed from the portion of the film sensor during a portion of the film advance operation defining a film sensing interval so as to permit substantially the full amount of the biasing force to be applied to film present in the film path during the film sensing interval;

wherein the film sensor detects for the presence of film in the film path only during the film sensing interval.

7. The camera according to claim 6 wherein the light lock door driver is operative between a first driver position corresponding to a light lock door closed position and second driver position corresponding to a light lock door open position and being biased toward the first driver position, and the film path is defined by a path between a film cassette compartment and a film spool compartment disposed on opposing sides of a film exposing area, further comprising:

a cover light tightedly enveloping the film path, film cassette compartment and film spool compartment, there being an aperture in the cover light tightedly isolated from the film path, film cassette compartment and film spool compartment and in substantial alignment with a portion of each of the light lock door driver and film sensor, the light lock door driver being movable from the first driver position to the second driver position via a tool inserted into the aperture, the film sensor being movable from the first sensor position to the second sensor position via the tool.

8. A tool in combination with the camera of claim 7, the tool comprising:

a handle portion at a proximal end thereof;

a pair of members at a distal end thereof, each member being adapted to be received into the aperture, a first one of the members being adapted to cooperate with the portion of the light lock door driver and a second one of the members being adapted to cooperate with the portion of the film sensor, at least one of the members being movable relative to the other member;

an actuator coupled to the movable member for moving the movable member relative to the other member.

9. An APS camera comprising:

a) a body having a portion light tightedly sealed by a cover;

b) a light lock door driver disposed on the body and adapted to cooperate with a light lock door of an APS film cassette disposed in the light tight portion of the camera;

c) a film sensor disposed on the body and adapted to sense the presence or absence of film in a film path disposed in the light light portion of the camera; and, d) an aperture in the cover providing light tight access to a portion of, and permitting manipulation of, both the light lock door driver and the film sensor exteriorly of the camera via a tool.

10. The camera according to claim 9 wherein the light lock door driver is biased to a light lock door closed position and the film sensor is biased into the film path, the tool being cooperative with the light lock door driver to move the driver from the light lock door closed position to a light lock door open position and being cooperative with the film sensor to move the film sensor out of the film path.

11. The camera according to claim 9 wherein the tool has a first member for manipulating the light lock door and a second member for independently manipulating the film sensor.

12. The camera according to claim 9 wherein, after the light lock door driver has been moved to the light lock door open position and the film sensor has been moved out of the film path, and the tool has been removed, the light lock door driver is normally biased against the film sensor to prevent The film sensor from sensing the presence or absence of film in the film path.

13. The camera according to claim 12 wherein the camera further comprises a rotatable film rewind mechanism and the light lock door driver is unbiased from the film sensor during a portion of the rotation of the film rewind mechanism to permit the film sensor to sense the presence or absence of film in the film path.

14. A method of loading an APS camera comprising:

a) inserting an APS film cassette into a film cassette compartment with a light lock door thereof closed, and then light tightedly sealing the camera;

b) inserting a tool into an aperture in a cover of the camera to light tightedly (i) manipulate a light lock door driver to cause the light lock door to open and (ii) manipulate a film sensor that is biased into a film path of the camera out of the film path;

c) winding the film from the film cassette to a film spool compartment in unexposed condition.

15. The method according to claim 14 wherein each step is performed outside of a darkroom without exposing the film.

16. The method according to claim 14, wherein the camera has a film advance/rewind mechanism, further comprising the step of:

a) operating the advance/rewind mechanism after the light lock door has been opened and the film sensor has been manipulated out of the film path to scroll film out of the cassette, across the film path, and into the film spool compartment.

17. An APS camera comprising:

a) a film sensor biased toward a film path of the camera for sensing the presence or absence of film in the film path, but being disposed out of the film path when film is present therein;

b) a light lock door driver having first and second positions corresponding to closed and open positions, respectively, of a light lock door of an APS film cassette, and being biased toward the first position;

c) a rewind mechanism for scrolling film that has been previously wound into a film spool compartment into the film cassette;

wherein:

d) the light lock door driver normally cooperates with the film sensor when the light lock door driver is in the second position and when the film sensor is disposed out of the film path to prevent the film sensor from sensing die presence or absence of film in the film path, and, e) the light lock door driver cooperates with the rewind mechanism to permit the film sensor to sense the presence or absence of film in the film path during a period of operation of the rewind mechanism defining a film sensing interval.

18. The APS camera according to claim 17 wherein the film sensor and light lock door driver further cooperate such that the film sensor prevents the light lock door driver from biasing to the first position when the film sensor is disposed out of the film path, and such that, when no film has been sensed in the film path during the film sensing interval, the film sensor biases into the film path and the light lock door driver biases to the first position to cause the light lock door to close.

* * * * *